July 13, 1965   D. A. AVNER   3,194,547
HYDRO-PNEUMATIC VEHICLE SUSPENSION UNIT
Filed April 28, 1961
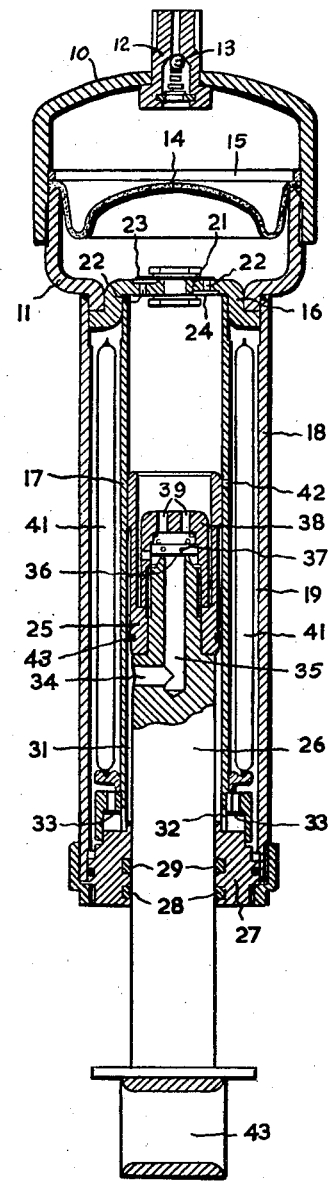
David Alan Avner
By: Scrivener & Parker United States Patent Office 3,194,547
Patented July 13, 1965

3,194,547
HYDRO-PNEUMATIC VEHICLE SUSPENSION UNIT
David Alan Avner, Ellerslie, Beaconsfield Road, Coventry, England
Filed Apr. 28, 1961, Ser. No. 106,355
3 Claims. (Cl. 267—64)

This invention relates to a vehicle suspension unit of the kind in which gaseous and liquid fluid means are employed to support the load and at the same time to maintain the body of the vehicle whilst in motion at a constant mean height from the ground. The device can in addition be arranged to act as a suspension damper.

The desirability of maintaining the body of a vehicle at a constant mean height from the ground (i.e. constant mean wheel deflection) has long been recognised, and various devices have been developed for this purpose, and some of these incorporate a pump actuated by relative movement between parts of the unit when the vehicle is in motion, the pump drawing liquid from a reservoir and delivering it into a pressure chamber containing liquid and air or other gas under pressure, and a substantially constant mean height of the vehicle body being obtained by allowing liquid to return from the pressure chamber to the reservoir when the unit has been extended through a predetermined distance.

One object of my invention is to provide a self-contained hydro-penumatic suspension unit which does not require a separate pump and which incorporates a minimum number of moving parts so that it is simple and economical to produce and is reliable in use.

According to my invention, a hydropneumatic suspension unit for a vehicle adapted to function as a self-levelling pneumatic spring comprises a cylinder communicating at one end with a pressure chamber containing a liquid and a gas, a piston working in the cylinder and carried by a piston-rod working through a guide closing the other end of the cylinder, a one-way valve connecting the annular space within the cylinder around the piston-rod with a reservoir for liquid, a second one-way valve connecting that space with the first end of the cylinder whereby, on relative axial movement between the cylinder and the piston, liquid is drawn from the reservoir and forced into the pressure chamber, and means for permitting the return of liquid from the pressure chamber to the reservoir at a predetermined position of the piston in the cylinder.

By the use of further valves and orifices the flow of fluid between chambers within the suspension unit may be restricted, and in this manner damping may be effected on the suspension of the vehicle if so desired. These additional valves and orifices may be combined with the valves and orifices used to perform the function of self-levelling.

A preferred form of suspension unit in accordance with my invention is illustrated by way of example in the accompanying drawing which is a longitudinal section of the unit.

In the unit illustrated the pressure chamber is formed from two cup-shaped steel members 10 and 11. The annular flange of the member 10 fits over and is screwed on to the flange of the member 11. A boss 12 is welded or otherwise secured into the end of the member 10 and is adapted to be attached to a spring part of a vehicle. The boss is drilled axially and a one-way valve 13 is located in the bore, and the outer end of the boss is formed to receive a connection for introducing air or other gas under pressure into the upper part of the chamber above a transverse flexible diaphragm 14 which divides the chamber. The peripheral edge of the diaphragm is clamped between the edge of the flange on the member 11 and a ring 15 located in an annular groove in the member 10.

The member 11 carries an integral annular spigot 16 into which is secured the upper end of a cylinder 17. A cylindrical shell 18 is screwed on to the outside of the spigot and is concentric about the cylinder, the annular space between the cylinder and the shell forming a reservoir 19 for liquid.

A fitting 21 is mounted in a central opening in the base of the member 11 in alignment with the cylinder, and passages 22 extending through the fitting are controlled by oppositely acting disc valves 23, 24. Liquid can thus flow between the upper end of the cylinder and the part of the pressure chamber below the diaphragm but the rate of flow is damped by the valves.

Working in the cylinder is a piston 25 secured to the upper end of a piston-rod 26 which is of a diameter less than that of the cylinder bore. The piston-rod works through a guide 27 which closes the lower ends of the cylinder and of the shell 18 and incorporates seals 28, 29 for the piston-rod.

There is an annular space 31 around the piston-rod between the piston and the closure 27, and the axial length of this space, and hence its volume, varies with relative axial movement between the cylinder and the piston.

The lower end of the space 31 is in communication through ports 32 in the cylinder wall and a one-way valve 33 with the reservoir 19 so that when the unit is compressed axially and the volume of the space 31 increases liquid will be drawn into that space from the reservoir.

A radial port 34 in the piston-rod leads from the space 31 into an axial bore 35 extending through to the upper end of the piston-rod which lies within an axial recess in the piston. The upper end of the bore 35 in engaged by a valve disc 36 which is loaded by a spring 37 and is housed within a cap 38 screwed on to the upper end of the piston-rod. Passages 39 drilled through the cap lead into the recess in the piston which is open to the upper end of the cylinder. Thus when the unit is extended and the volume of the annular space 31 is reduced liquid is forced out of the space through the valve 36 into the upper end of the cylinder.

A part of the volume of the reservoir 19 is occupied by a compressible flexible bag 41 which is filled with air or other gas and can change its volume to accommodate changes in the volume of liquid in the reservoir. A single bag may be employed, or there may be two or more smaller bags.

A port 42, or a number of such ports, is provided in the wall of the cylinder in such an axial position that it is uncovered by the piston when the unit has been extended to a length corresponding to the height at which the body of the vehicle is to be maintained. It will be noted that the piston 25 carries a seal 43 which engages the surface of the cylinder and is located adjacent the lower end of the piston sufficiently below the port 42 that the seal never passes the port in any position of the piston. This arrangement eliminates wearing problems that would be occasioned by the constant sliding of the seal past the inner end of the port 42.

The lower end of the piston-rod is provided with an eye 43 for attachment to an axle or other unsprung part of the vehicle.

Initially the cylinder, the annular space 31 around the piston-rod, the part of the pressure chamber below the diaphragm 14, and the reservoir 19 are completely filled with liquid, and the part of the pressure chamber above the diaphragm is filled with air or gas under pressure.

The load on the axle or other unsprung part of the vehicle to which the unit is attached compresses the unit axially to an extent dependent on the pressure in the pressure chamber, the load being supported by that pressure acting on the area of the piston rod.

When the vehicle is in motion inequalities in the road surface cause relative axial movement between the cylinder and the piston with the result that liquid is drawn from the reservoir into the annular space 31 and is forced from there into the upper end of the cylinder and into the pressure chamber below the diaphragm 14. The length of the unit is thus progressively increased until the port 42 is uncovered by the piston. Liquid can then return from the cylinder to the reservoir and no further extension of the unit takes place, the body of the vehicle being maintained at a substantially constant mean level at which the quantity of liquid transferred from the reservoir to the pressure chamber is equal to the quantity of liquid, returning through the port or ports 42.

If the loading of the vehicle is increased the unit is compressed and more liquid is drawn from the reservoir and pumped into the upper end of the cylinder and into the space below the diaphragm in the pressure chamber so that the pressure of the air or other gas in the space above the diaphragm is increased to an extent sufficient to support the increased load, the body of the vehicle again being maintained at the predetermined level.

Relative axial movements between the cylinder and the piston are damped by the valves 23 and 24 through which the liquid has to flow in passing between the cylinder and the pressure chamber so that a smooth action of the unit is obtained even on a rough road surface.

I claim:

1. A self-adjusting hydro-pneumatic spring suspension unit for a vehicle comprising a cylinder, an annular reservoir surrounding the cylinder and having its inner wall formed by the cylinder, a pressure chamber communicating with a first end of said cylinder and containing a liquid and a gas, a piston working in the cylinder, a piston-rod of less diameter than the cylinder carrying said piston, a closure for the second end of the cylinder through which said piston-rod works, the piston and the end closure defining the ends of an annular pumping space of variable axial length between the piston-rod and the cylinder, a passage connecting said pumping space with the first end of the cylinder, a first one-way valve in said passage permitting flow only from the pumping space into the first end of the cylinder, a second passage connecting said pumping space with the reservoir, a one-way valve in said passage permitting flow only from the reservoir into the pumping space, and a port in the cylinder wall leading directly and freely into the reservoir and controlled by the piston, said port permitting flow directly from the first end of the cylinder to the reservoir at a predetermined axial position of the piston.

2. A self-adjusting hydro-pneumatic spring suspension unit for a vehicle as in claim 1 wherein said piston carries a seal engaging the surface of the cylinder and located adjacent to the end of the piston remote from the first end of the cylinder, and said port in the cylinder wall is controlled by a portion of the piston remote from the seal whereby the seal does not pass the port in any position of the piston.

3. A self-adjusting hydro-pneumatic spring suspension unit for a vehicle comprising a cylinder, an annular reservoir surrounding the cylinder and having its inner wall formed by the cylinder, a pressure chamber communicating with a first end of said cylinder and containing a liquid and a gas, a piston working in the cylinder, a piston-rod of less diameter than the cylinder carrying said piston, a closure for the second end of the cylinder through which said piston-rod works, the piston and the end closure defining the ends of an annular pumping space of variable axial length between the piston-rod and the cylinder, a passage connecting said pumping space with the first end of the cylinder, a first one-way valve in said passage permitting flow only from the pumping space into the first end of the cylinder, a second passage connecting said pumping space with the reservoir, a one-way valve in said passage permitting flow only from the reservoir into the pumping space, whereby relative axial movement between the piston and the cylinder due to suspension movements of a vehicle to which the unit is fitted produces continuous transfer of liquid from the reservoir to the first end of the cylinder, and a port in the cylinder wall leading into the reservoir and controlled by the piston to permit flow directly from the first end of the cylinder to the reservoir at a predetermined axial position of the piston.

References Cited by the Examiner

UNITED STATES PATENTS

| | | | |
|---|---|---|---|
| 1,918,322 | 7/33 | Cross | 267—64 |
| 2,436,573 | 2/48 | Heynes | 267—64 |
| 2,564,790 | 8/51 | Orloff et al. | 267—64 |
| 2,802,664 | 8/57 | Jackson | 267—64 |
| 2,946,582 | 7/60 | Martin | 267—64 |
| 2,980,418 | 4/61 | Doetsch | 267—64 |
| 3,024,875 | 3/62 | Stulz | 267—64 X |
| 3,094,317 | 6/63 | Axthammer. | |
| 3,110,485 | 11/63 | Axthammer. | |
| 3,112,923 | 12/63 | Ley | 267—64 X |
| 3,128,088 | 4/64 | Paschakarnis | 267—64 |

MILTON BUCHLER, *Primary Examiner.*

R. A. DOUGLAS, ARTHUR L. LA POINT, *Examiners.*